(12) United States Patent
Chino et al.

(10) Patent No.: US 6,344,537 B1
(45) Date of Patent: Feb. 5, 2002

(54) VULCANIZING AGENT FOR RUBBER AND RUBBER COMPOSITION CONTAINING THE SAME

(75) Inventors: Keisuke Chino; Hidekazu Onoi, both of Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/594,726

(22) Filed: Jun. 16, 2000

(30) Foreign Application Priority Data

Jun. 29, 1999 (JP) .......................................... 11-183884

(51) Int. Cl.[7] .......................... C08G 75/04; C09K 15/10
(52) U.S. Cl. ....................... 528/376; 528/378; 528/380; 252/406
(58) Field of Search ........................ 252/406; 528/376, 528/378, 380

(56) References Cited

U.S. PATENT DOCUMENTS

| 2,962,457 A | | 11/1960 | Mackinney | |
| 3,624,052 A | * | 11/1971 | Gobran | ........................ 528/380 |
| 3,624,055 A | * | 11/1971 | Gobran | ........................ 528/392 |

* cited by examiner

*Primary Examiner*—Kriellion A. Sanders
(74) *Attorney, Agent, or Firm*—Arent Fox Kintner Plotkin & Kahn, PLLC

(57) ABSTRACT

To provide a rubber vulcanizing agent able to prevent a reduction in the various physical properties of a vulcanized rubber after aging and possible to suppress scorching due to premature vulcanization or reversion and a rubber composition containing the same.

A rubber vulcanizing agent having at least two thiirane groups in the molecule thereof and a rubber composition containing this rubber vulcanizing agent and a thiirane ring-opening agent.

10 Claims, No Drawings

VULCANIZING AGENT FOR RUBBER AND RUBBER COMPOSITION CONTAINING THE SAME

BACKGROUND OF THE INVENTION

1. Field of the Invention

The present invention relates to a rubber vulcanizing agent and a rubber composition containing the same. More specifically, it relates to a rubber vulcanizing agent capable of preventing decreases in the physical properties of a vulcanized rubber after aging, of suppressing scorching due to premature vulcanization or reversion and of improving reversion resistance and aging resistance and also relates to a rubber composition containing the same.

2. Description of the Related Art

In the past, there has been the problem that since the bond strength of polysulfide bonds produced during the cross-linking are weak, the bonds break and reversion occurs during vulcanization of rubber or even after vulcanization, the polysulfide bonds in the rubber easily break, the physical properties of the rubber after aging, such as the strength at break or elongation at break, ended up falling. Further, it is known that a vulcanizing agent having a thiol group (SH—) exhibits a high reactivity with a diene rubber. The vulcanization of rubber can be speeded up, but then the problem arises that the reactivity becomes conversely too high and vulcanization ends up occurring during the kneading of the rubber, i.e., so-called scorching ends up occurs.

SUMMARY OF THE INVENTION

Accordingly, the objects of the present invention are to eliminate the above-mentioned problems in the prior art and to provide a rubber vulcanizing agent capable of preventing a decline in the physical properties of the vulcanized rubber after aging and of suppressing scorching due to premature vulcanization or reversion and also to a rubber composition containing the same.

Another object of the present invention is to provide a vulcanizing agent for rubber capable of improving reversion resistance and aging resistance and a rubber composition containing the same.

Other objects and advantages of the present invention will be apparent from the following description.

In accordance with the present invention, there is provided a rubber vulcanizing agent comprising a compound having at least two thiirane groups in one molecule thereof.

In accordance with the present invention, there is also provided a rubber composition containing a compound having at least two thiirane groups in one molecule thereof and a thiirane ring-opening agent.

In accordance with the present invention, there is still further provided a rubber composition comprising 100 parts by weight of a rubber, 0.1 to 30 parts by weight of a compound having the thiirane group and 0.1 to 30 parts by weight of the thiirane ring-opening agent.

In accordance with the present invention, there is still further provided a rubber composition comprising 100 parts by weight of a rubber, 0.1 to 30 parts by weight of a compound having at least two thiirane groups in one molecule thereof, 0.1 to 30 parts by weight of a sulfenamide type vulcanization accelerator and/or a sulfenimide type vulcanization accelerator and 0.01 to 5 parts by weight of sulfur.

In accordance with the present invention, there is still further provided a rubber composition further comprising 0.5 parts by weight or less of an organic fatty acid and/or 0.5 to 30 parts by weight of a metal oxide, both based upon 100 parts by weight of the rubber, in the above-mentioned rubber compositions.

DESCRIPTION OF THE PREFERRED EMBODIMENTS

The rubber vulcanizing agent according to the present invention is a compound having two or more thiirane groups (i.e., episulfide groups) shown in the following formula in one molecule (hereinafter referred as a thiirane group-containing compound). A thiirane group is a group having the following structure:

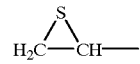

The present inventors found that, by blending a compound having two or more thiirane groups in one molecule thereof and a thiurane ring-opening agent such as a nucleophilic reagent, electrophilic reagent, or a compound having these functional groups protected into a rubber, the thiirane group-containing compound acts as a vulcanizing agent. That is, upon heating, the thiirane group-containing compound and thiirane ring-opening agent are reacted with each other to generate a thiolate ion or radical, whereby the rubber is cross-linked. In this way, a thiirane group-containing compound is a latent vulcanizing agent which does not act as a vulcanizing agent before heating and causes cross-linking by a reaction of a thiolate ion or radical produced from the thiirane group upon heating with a rubber polymer. Therefore, a vulcanizing agent capable of suppressesing scorching before vulcanization is obtained by the use of the thiirane group-containing compound. The vulcanizing agent thus formed provides a fast vulcanization rate during vulcanization. Further, the cross-linking bonds produced due to the vulcanization are monosulfide bonds. Unlike polysulfide bonds, these are not easily broken, and therefore, it is also possible to suppress reversion and decreases in the physical properties of the rubber such as strength at break and elongation at break of the vulcanized rubber after aging.

The present inventors also found that the modulus is increased by adding sulfur and the reaction between the thiirane group and the ring-opening agent is accelerated with a metal oxide. Furthermore, since an organic acid such as stearic acid is liable to inhibit the reaction between the thiirane group and the thiirane ring-opening agent, the compounding amount thereof should be preferably minimized or should not be used.

To obtain the thiirane group-containing compound used in the present invention, for example, it is possible to substitute all or part of the oxirane rings of the epoxy compound having at least two oxirane rings shown in the following formula in one molecule thereof with thiirane rings, whereby the compound is converted to the desired compound having at least two thiirane rings in one molecule thereof.

The epoxy compound used for obtaining the thiirane group-containing compound according to the present invention is, for example, a compound having the following formula (a), (b), (d), (e), or (f) where the substituent groups Y are all oxirane rings or a compound having the following formula (c) where Z is an oxygen atom. The n is 0 or a number of more than 0.

(a)
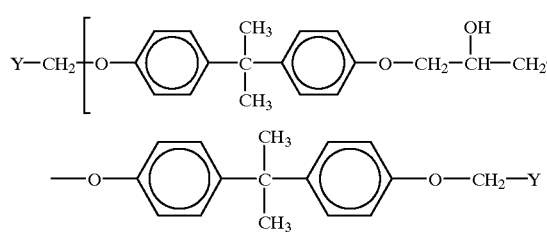

(b)
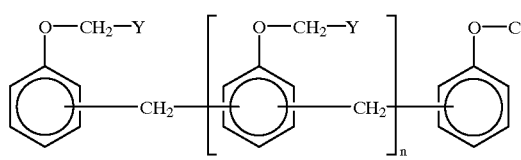

(c)
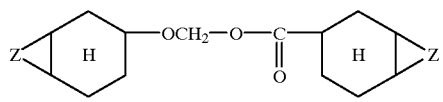

(d)
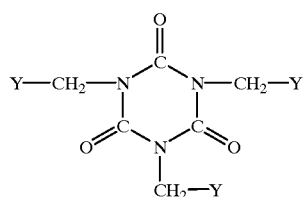

(e)
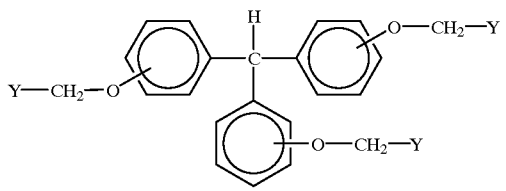

-continued (f)
$$Y-CH_2-O-R-O-CH_2-Y$$

Further, these epoxy compounds may be compounds in which the hydrogen atoms or other groups in the molecule are substituted with halogen atoms. For example, they may be compounds having the following formula (g):

(g)
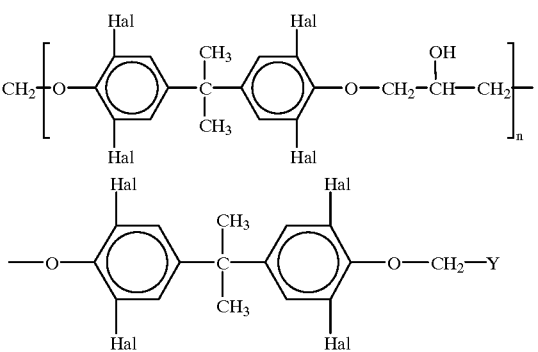

wherein Hal indicates a halogen atom.

Example of the halogen atom are bromine, chlorine, flourine, etc.

In the present invention, the thiirane group-containing compound is a compound of the above formula (a), (b), (c), (d), (e), (f), or (g) where at least two of Y are thiirane rings, a compound where the Y's other than the thiirane rings are oxirane rings, or a compound where at least one of Z is S and the other Z's are 0.

The specific examples of the thiirane group-containing compound are those shown by the following formulas. These include compounds having the following formulas where at least two of Y are thiirane rings and the Y's other than the thiirane rings are oxirane rings or compounds where at least one of Z is S and the other Z's are 0. Further, n is a number of 0 or more.

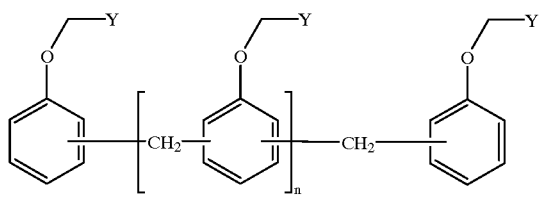

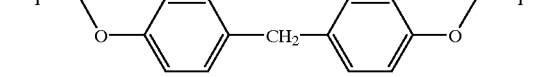

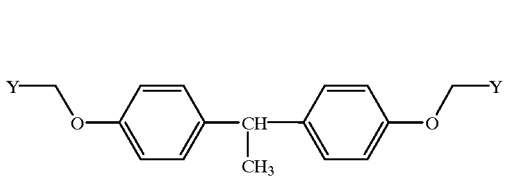

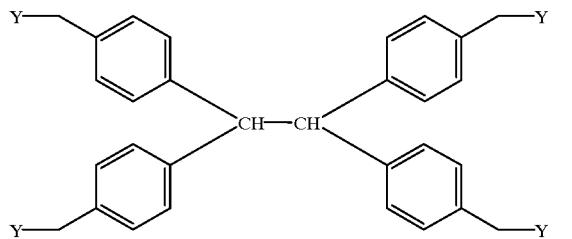

-continued

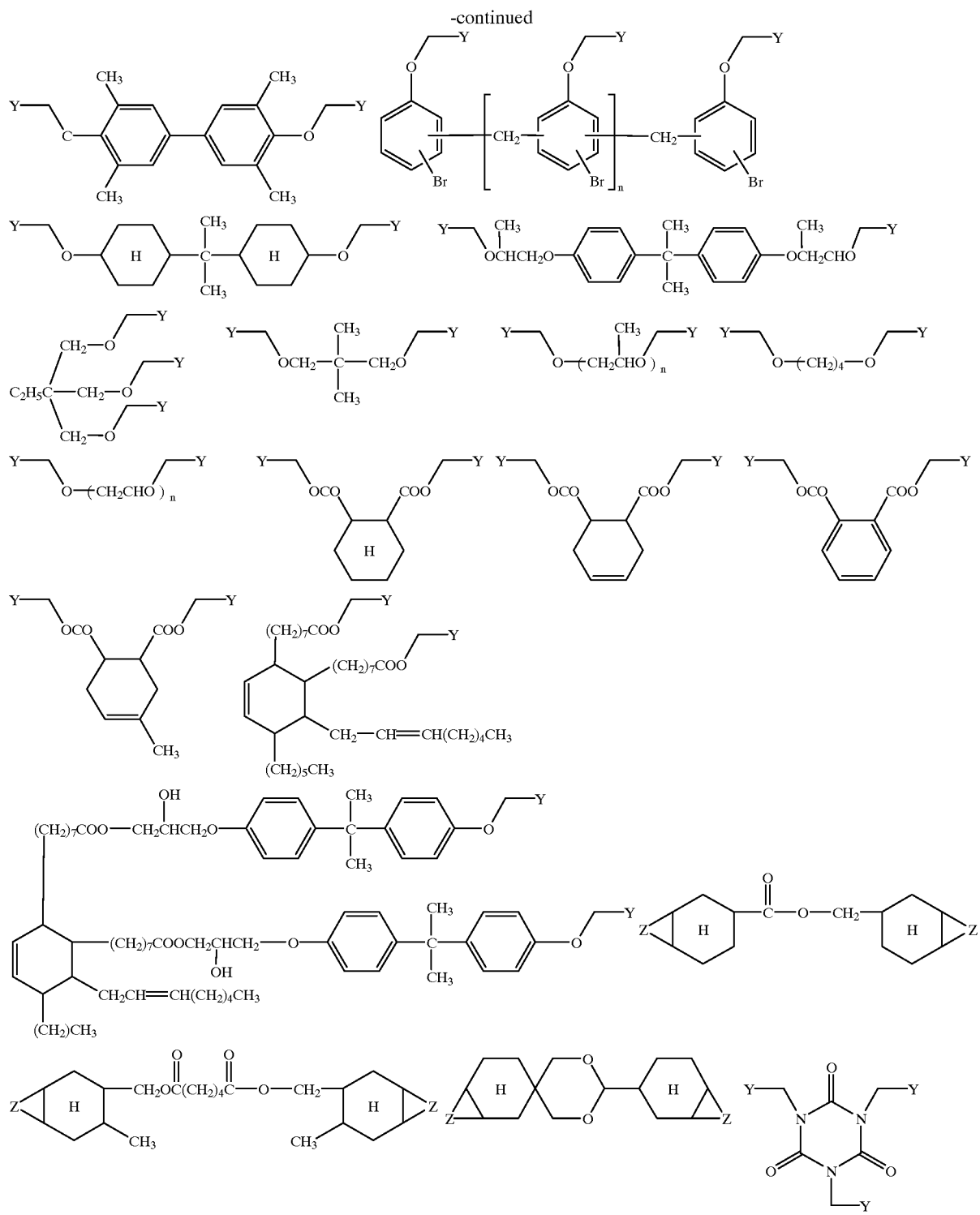

The thiirane group-containing compound can be produced by the method of reacting an epoxy compound and potassium thiocyanate (KSCN), thiourea, etc. in a polar solvent with vigorous stirring.

As the polar solvent, for example, methanol, ethanol, acetone, water, or mixed solvents of the same may be used. Further, to obtain a compound (A) with a substitution ratio of 100%, that is, a ratio of content of oxirane rings/thiirane rings of 0/100, it is preferable to use acetone as the solvent.

The reaction can usually be performed in the temperature range of 10 to 35° C., for example, room temperature, for a reaction time of 10 to 40 hours or so, for example, about 20 hours. Further, the atmosphere of the reaction may be air or a nitrogen or other inert gas atmosphere. By raising the reaction temperature, it is possible to increase the reaction rate and further reduce the reaction time, but if more than 100° C., side reactions of the thiirane group are liable to unpreferably occur.

According to the present invention, the thiirane group-containing compound preferably comprises 0.1 to 30 parts by weight, more preferably 1 to 15 parts by weight, based upon 100 parts by weight of a rubber. If the amount blended is less than 0.1 part by weight, the crosslinking density tends to decrease, whereas if more than 30 parts by weight, after vulcanization, the thiirane group-containing compound or the reaction product thereof is liable to unpreferably bleed out to the rubber surface.

Although the thiirane ring-opening agent usable in the present invention is not particularly limited, it is possible to use a compound having an action producing a thiolate ion or radical by a reaction with a thiirane ring such as a nucleophilic reagent, electrophilic reagent, or compounds protecting these functional groups. Note that, for example, it may also be a compound provided with both of a nucleophilic portion (—H) and an electrophilic portion (—O—) in a molecule such as a hydroxyl group (—OH). By protecting the nucleophilic portion or electrophilic portion (i.e., functional group) by a suitable organic group, it is possible to use heat or other stimulus to return the protected group to a nucleophilic group or electrophilic group, whereby a latent thiirane ring-opening agent is realized. Specifically, a compound having at least one group selected from a hydroxyl group, mercapto group, amino group, carboxyl group, aldehyde group, and hydrogen group bonded at the α-position of a carbonyl group or protected groups of these groups similar to the above is preferable in the point of being fast in reaction rate. Further, the thiirane ring-opening agent may be a rubber vulcanization accelerator or antioxidation agents or may be those commonly used as a curing agent of an epoxy resin-type adhesive.

Examples of the thiirane ring-opening agent used in the present invention are alcohols, amines, acid or acid anhydride type compounds, aldehydes, compounds having hydroxyl groups bonded to the α-positions of carbonyl groups, basic active hydrogen compounds, imadazoles, thiols, phenol resins, urea resins, melamine resins, isocyanate type compounds, latent curing agents, ultraviolet curing agents, etc.

The specific examples of the alcohol are aliphatic alcohols such as methanol, ethanol, butanol, propanol, hexanol, stearyl alcohol, hexanediol, and propanediol and aromatic alcohols such as phenol, p-methylphenol, bisphenol A, and bisphenol F.

The specific examples of amides are aliphatic monofunctional alcohols such as methylamine, ethylamine, butylamine, propylamine, hexylamine, and stearylamine; polyamines such as ethylenediamine, diethylenetriamine, triethylenetetramine, tetraethylenepentamine, hexamethylenediamine, iminobispropylamine, bis(hexamethylene)triamine, and 1,3,6-trisaminomethylhexane; polymethyldiamines such as trimethylhexamethylenediamine, polyetherdiamine, and diethylaminopropylamine; aromatic monofunctional amines such as phenylamine and p-methylamine; alicyclic polyamines such as mencenediamine (MDA), isophoronediamine (IPDA), bis(4-amino-3-methylcyclohexyl)methane, N-aminoethylpiperadine(N-AEP), diaminodicyclohexylmethane, bisaminomethylcyclohexane, 3,9-bis(3-aminopropyl)-2,4,8,10-tetraoxaspiro(5,5) undecane; aliphatic polyamines including aromatic rings such as methaxylene diamine; aromatic polyamines such as metaphenylene diamine, diaminodiphenylmethane, diaminodiphenylsulfone, and diaminodiethyldiphenylmethane; or 3,9-bis(3-aminopropyl)-2,4,8,10-tetraspiro[5.5] undecane, etc. Further, an amine adduct (polyamine epoxy resin adduct), polyamine-ethylene oxide adduct, polyamine-propyleneoxyd adduct, cyanoethylated polyamine, a reaction product of aliphatic polyamine and ketone, that is, ketimine; secondary amines or tertiary amines such as linear diamine, tetramethyl guanidine, triethanolamine, piperidine, pyridine, benzyldimethylamine, picoline, 2-(dimethylaminomethyl)phenol, dimethylcyclohexylamine, dimethylbenzylamine, dimethylhexylamine, dimethylaminophenol, dimethylamino-p-cresol, N,N'-dimethylpiperazine, piperidine, 1,4-diazadicyclo(2,2,2)octane, 2,4,6-tris (dimethylaminomethyl)phenol, and 1,8-diazabicyclo(5,4,0) undecene-1; or liquid polyamides obtained by reacting dimer acid with a polyamine such as diethylene triamine and triethylene tetramine, etc.

The specific examples of an alicyclic polyamine compound are mencenediamine (MDA), isophoronediamine (IPDA), bis(4-amino-3-methylcyclohexyl)methane, N-aminoethylpiperadine N-AEP), etc. and their modified 3-aminomethyl-3,5,5-trimethylcyclohexylamine-bisphenol A diglycidyl ether adduct, etc.

The specific examples of the acid or acid anhydride compound are aromatic monofunctional carboxylic acids such as acetic acid, propionic acid, palmitic acid, and stearic acid; aromatic monofunctional carboxylic acids such as benzoic acid and p-methylbenzoic acid; polycarboxylic acids such as adipic acid, azelaic acid, and decanedicarboxylic acid; aromatic acid anhydrides such as phthalic anhydride, trimellitic anhydride, ethyleneglycolbis (anhydrotrimellitate), glyceroltris(androtrimellitate), and pyromellitic anhydride, 3,3', 4,4'-benzophenonetetracarboxylate anhydride; an alicyclic acid anhydride such as maleic anhydride, succinic anhydride, tetrahydrophthalic anhydride, methyltetrahydrophthalic anhydride, methylnadic anhydride, alkenylsuccinic anhydride, hexahydrophthalic anhydride, methylhexahydrophthalic anhydride, methylcyclohexenetetracarboxylic anhydride, methylhymic anhydride, trialkyltetrahydrophthalic anhydride, and poly(phenylhexadecanediacid) anhydride; aliphatic acid anhydrides such as polyadipic anhydride, polyazelaic anhydride, polysebacic anhydride, dodecenylsuccinic anhydride, and poly (ethyloctadecanediacid)anhydride; halogenated acid anhydrides such as chlorendic anhydride, tetrabromophthalic anhydride, and hetic acid anhydride.

The specific examples of aldehydes are aliphatic aldehydes such as acetoaldehyde, propionaldehyde, stearylaldehyde, propanedialdehyde, and benzenedialdehyde and aromatic aldehydes such as benzaldehyde and p-methylbenzaldehyde.

The specific examples of compounds having a hydrogen group bonded to the α-position of a carbonyl group are dimethyl malonate and diethyl malonate.

The specific examples of basic active hydrogen compounds are dicyandiamide, organic acid dihydrazide, etc.

The specific examples of imidazoles are 2-methylimidazole, 2-ethyl-4-methylimidazole, 2-undecylimidazole, 2-heptadecylimidazole, 2-phenylimidazole, 1-benzyl-2-methylimidazole, 1-cyanoethyl-2-methylimidazole, 1-cyanoethyl-2-ethyl-4-methylimidazole, 2-methylimidazolium-isocyanulate, 2,4-diamino-6-[2-methylimidazoline-(1)]-ethyl-S-triazine, 2,4-diamino-6-[2-ethyl-4-methylimidazoline-(1)]-ethyl-S-triazine, etc.

The specific examples of thiols are ethanethiol, propanethiol, ethanedithiol, propandithiol thioglycolic acid, thioacetic acid, benzenethiol, benzenedithiol, partial epoxy adducts of 2,21'-bismercaptoethylether; esters of thioglycolic acid such as pentaerythritol tetrathioglycolate, dipentaerythritol hexathioglycolate, and trimethylol propantrithioglycolate; polysulfide rubber having mercapto groups at its ends, etc.

The specific examples of the isocyanate type compound are isocyanate compounds such as toluene diisocyanate, hexamethylene diisocyanate, and xylene diisocyanate, block isocyanate compounds obtained by masking the isocyanate groups by reaction with phenol, alcohol, caprolactum, etc.

Example of the rubber vulcanization accelerators used as a thiirane ring-opening agent are preferably thiuram type, dithiocarbamate type, sulfenamide type, thiazole type, xanthogenate type, thiourea type, guanidine type, and other accelerators may mentioned. Specifically, nickel dibutyldithiocarbamate, zinc dimethyldithiocarbamate, ferric dimethyldithiocarbamate, zinc dibutyldithiocarbamate, zinc butylxanthogenate, tetramethylthiuram monosulfide, tetramethylthiuram disulfide, 2-mercaptobenzothiazole, tetraethylthiuram disulfide, tetrabutylthiuram disulfide, dipentamethylenethiuram tetrasulfide, dibenzothiazyl disulfide, zinc 2-mercaptobenzothiazole, 2-(4,4'-morpholinodithio) benzothiazole, N,N-diethylthiocarbamoyl-2-benzothiazolyl sulfide, N-cyclohexyl-2-benzothiazolyl sulfenamide, N-t-butyl-2-benzothiadizolyl sulfenamide, N-oxydiethylene-2-benzothiazolyl sulfenamide, N,N'-dicyclohexyl-2-benzothiazolyl sulfenamide, 1,3-diphenylguanidine, di-o-tolylguanidine, di-o-tolylguanidine salt of dicatecholborate, hexamethylene tetramine, zinc dialkyldithiophosphenate, N-t-butyl-2-benzothiazylsulfenamide, a reaction product of N-butylaldehyde and aniline, N,N'-diphenylthiourea, trimethylthiourea, etc. may be mentioned. In particular, as a sulfenamide type vulcanization accelerator, N-cyclohexyl-2-benzothioazolyl sulfenamide, N-t-butyl-2-benzothiazolyl sulfenamide, and N,N'-dicyclohexyl-2-benzothiazyl sulfenamide are preferably used, while as a thiuram type vulcanization accelerator, tetramethylthiuram monosulfide, tetramethylthiuram disulfide, 2-mercaptobenzothiazole, tetraethylthiuram disulfide, tetrabutylthiuram disulfide, and dipentamethylenethiuram tetrasulfide.

Examples of the antioxidant used as the thiirane ring-opening agent are 2,6-di-t-butyl-p-cresol, 2,2-methylene bis 4-methyl-6-t-butylphenol, mono α-methyl-benzylphenol, di α-methyl-benzylphenol, tri α-methyl-benzylphenol, 2-mercaptobenzimidazole, 2-mercaptomethylbenzimidazole, dilauryl dithiopropionate, N-phenyl-N'-1,3-dimethylbutyl-p-phenylenediamine, N,N'-diphenyl-p-phenylenediamine, N-phenyl-N'-isopropyl-p-phenylenediamine, 6-ethoxy-1,2-dihydro-2,2,4-trimethylquinoline, poly(2,2,4-trimethyl-1,2-dihydroquinoline), octylated diphenylamine, a reaction product of diphenylamine and acetone, N,N'-di-2-naphthyl-p-phenylenediamine, mixed diaryl-p-phenylenediamine, N-(3-methacryloyloxy-2-hydroxypropyl)-N'-phenyl-p-phenylenediamine, special waxes, etc.

When the thiirane ring-opening agent is an alcohol, examples of the protecting group protecting the hydroxyl group are an ether type protecting group such as methylether, triphenylmethylether, benzylether, trimethylsilylether, t-butyldimethylsilylether, t-butyldiphenylsilylether, tetrahydropyranylether, 2-methoxyethoxymethylether, and methoxymethylether and an acetal type protecting group such as acetonid (isopropylideneacetal), an ester type protecting group such as acetyl, benzoyl, and p-nitrophenoxycarbonyl. Further, when the thiirane ring-opening agent is an enol, examples of the protecting group protecting the hydroxyl group are silylenolether, etc.

Further, when the thiirane ring-opening agent is an amine, examples of the protecting group protecting the amino group are an amide type protecting group such as acetoamide, trifluoroacetoamide, and benzamide; an imide type protecting group such as phthalimide; a urethane type protecting group such as benzylurethane and t-butoxyurethane; an alkyl type protecting group such as benzyl; a sulfonamide type protecting group such as p-toluene sulfonamide; a salt of an amino group and stearic acid or other aliphatic carboxylic acid, a salt of an amino group and benzoic acid or other aromatic carboxylic acid.

Further, when the thiirane ring-opening agent is a carboxylic acid, examples of the protecting group protecting the carboxylic group are an ester type protecting group such as a methylester, t-butylester, benzylester, and triphenylmethylester; a salt of a carboxyl group and stearylamine or other aliphatic amine; and a salt of a carboxyl group and aniline or other aromatic amine.

Further, when the thiirane ring-opening agent is a compound having a hydroxyl group bonded at the α-position of the carbonyl group, examples of the protecting group protecting the hydrogen group bonded to the α-position of the carbonyl group are a formyl group and dithioacetal group.

Further, when the thiirane ring-opening agent is a thiol, examples of the protecting group protecting the thiol group are thioether, benzylthioether, thioester, benzoylthioester, thiocarbamate, salts of thiol groups and aliphatic amines such as stearylamine, salts of thiol groups and aromatic amines.

According to the present invention, the thiirane ring-opening agent is preferably contained in an amount of 0.1 to 30 parts by weight, more preferably 1 to 15 parts by weight, based upon 100 parts by weight of the rubber. If the amount blended is less than 1 part by weight, the vulcanization proceeds with difficulty, while if more than 30 parts by weight, the thiirane ring-opening agent or its reaction product unpreferably migrates or bleeds out to the rubber surface after vulcanization.

According to the present invention, sulfur and/or a metal oxides, in addition to the thiirane group-containing compound and, as the thiirane ring-opening agent, sulfenamide type and/or sulfenimide type vulcanization accelerator, may be used. Any sulfur generally used for vulcanization of rubber may be used as the sulfur. The amount of the sulfur in the composition is preferably 0.01 to 5 parts by weight, more preferably 0.1 to 3 parts by weight, based upon 100 parts by weight. When the amount of the sulfur is too small, the crosslinking density, and therefore, the strength are unpreferably decreased. Contrary to this, when the amount is too large, the crosslinking density becomes too high, and therefore, resultant product becomes too hard.

The rubber composition according to the present invention may further preferably contain 0.5 to 30 parts by weight, more preferably 1–10 parts by weight, based upon 100 parts by weight of the rubber, of a metal oxide (e.g., zinc oxide, zinc carbonate, lead monoxide, lead oxide, lead carbonate, magnesium oxide, calcium hydroxide, aluminum oxide, calcium oxide, titanium oxide, ferric oxide, copper oxide). If the amount of the metal oxide is too small, it is not preferable that the intended acceleration of the reaction between the thiirane and the thiirane-group opening agent does not occur, whereas if too large, the physical properties of the rubber are unpreferably decreased.

When the rubber composition according to the present invention contains an organic fatty acid (e.g., stearic acid, parmitic acid, lauric acid, myristic acid, oleic acid, behenic acid, isostearic acid), which is conventionally used as a vulcanization acceleration, the reaction between the thiirane group and the thiirane group ring-opening agent tends to be inhibited, the amount compounded in the rubber composition should be preferably minimized or even preferably the organic fatty acid should not be used. Thus, the amount of the organic fatty acid is 0.5 parts by weight or less, more preferably 0 to 0.1 parts by weight, based upon 100 parts by weight of the rubber.

The rubber usable in the present invention is not particularly limited, but any rubber generally blended into various types of rubber compositions in the past, for example, natural rubber (NR), polyisoprene rubber (IR), styrene butadiene copolymer rubber (SBR), polybutadiene rubber (BR), acrylonitrile butadiene copolymer rubber (NBR), butyl rubber (IIR), chloroprene rubber, ethylenepropylene copolymer rubber (EPR), ethylene-propylene diene copolymer rubber (EPDM), etc. may be mentioned. These rubbers may be used alone or in any blend thereof.

The rubber composition of the present invention may contain, if necessary, any compounding agents ordinarily used in the rubber industry. Examples of such compounding agents are fillers such as carbon black and silica, vulcanization accelerators, vulcanization promoters, antioxidants, plasticizers, softeners, etc. These may be blended in an appropriate amount.

The vulcanizing agent of the present invention and rubber composition containing the same may be used for tires, hoses, conveyor belts, rubber sheets, fenders, rubber vibration isolators, rollers, linings, rubber-coated fabrics, sealing materials, rubber gloves, and other various types of rubber products, but are preferably used for rubber compositions for tires.

EXAMPLES

The present invention will now be further illustrated by, but is by no means limited to, the following Examples.

Synthesis of Vulcanizing Agent 1

990 g (6.78 moles) of neopentyl-diglycidyl ether (made by Toto Kasei, PG202) was added to a mixed solution of 450 ml of ethanol and 645 ml of water in which 774.4 g of potassium thiocyanate (8 moles) was dissolved. The mixture was vigorously stirred at room temperature for 12 hours, then the upper layer was removed. The lower layer was washed with water, then dried over magnesium sulfate and then dried in vacuo to obtain the vulcanizing agent 1 as shown in the following formula with oxirane rings converted to thiirane rings. The content of thiirane group was confirmed by NMR analysis to be 100%.

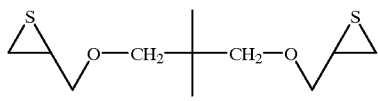

Synthesis of Vulcanizing Agent 2

The same process as with the vulcanizing agent 1 was used to obtain the vulcanizing agent 2 as shown in the following formula with oxirane rings converted to thiirane rings except for using the glycidylether of bisphenol F instead of neopentyl-diglycidylether. The content of thiirane group was confirmed by NMR analysis to be 100%.

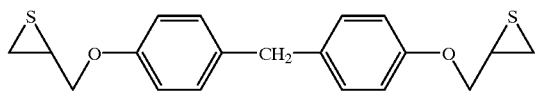

Synthesis of Vulcanizing Agent 3

The same process as with the vulcanizing agent 1 was used to obtain the vulcanizing agent 3 shown in the following formula with oxirane rings converted to thiirane rings except for using the glycidylether of hydrogenated bisphenol A instead of neopentyl-diglycidyl ether. The content of thiirane group was confirmed by NMR analysis to be 100%.

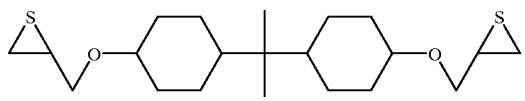

Examples 1 to 4 and Comparative Examples 1 to 5

Rubber compositions of the formulations shown in the following Table 1 containing the vulcanizing agents 1 to 3 obtained above and various vulcanization accelerators were produced and measured for rheometer characteristics as follows. The vulcanization was performed under conditions of 160° C.×60 minutes for Comparative Example 5 and 150° C.×30 minutes otherwise. The strength at break and elongation at break were measured before and after aging at 100° C. for 48 hours and the retention rates (after aging/before aging) were found.

Note that for example the reaction between the vulcanizing agent 1 and vulcanization accelerator CZ and the subsequent cross-linking reaction may be schematically illustrated as follows:

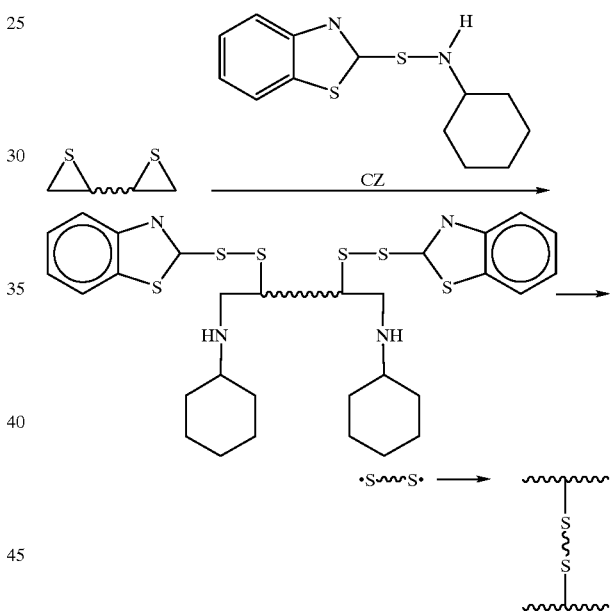

Rheometer Characteristics

Based on JIS K6300, as the index of T95, the time (minutes) until reaching a 95% vulcanization degree at 150° C. was measured. The smaller T95, the faster the vulcanization rate. Further, the times (minutes) for the torque of the rheometer to fall 3% and 5% from the peak were made T-3 and T-5. The smaller T-3 and T-5, the smaller the reversion. Samples where no peak of torque could be observed did not suffer from any reversion, and therefore, are indicated as "none".

Strength at Break (MPa)

Measured according to JIS K6251.

Elongation at Break (%)

Measured according to JIS K6251.

TABLE I

| Ex. | Ex. 1 | Ex. 2 | Ex. 3 | Ex. 4 | Comp. Ex. 1 | Comp. Ex. 2 | Comp. Ex. 3 | Comp. Ex. 4 | Comp. Ex. 5 |
|---|---|---|---|---|---|---|---|---|---|
| IR | 100 | 100 | 100 | 100 | 100 | 100 | 100 | 100 | 100 |
| Carbon black | 50 | 50 | 50 | 50 | 50 | 50 | 50 | 50 | 50 |
| Zinc oxide | 3 | 3 | 3 | 3 | 3 | 3 | 3 | 3 | 3 |
| Stearic acid | 1 | 1 | 1 | 1 | 1 | 1 | 1 | 1 | 1 |
| Antioxidant | 1 | 1 | 1 | 1 | 1 | 1 | 1 | 1 | 1 |
| Vulcanizing agent 1 | 4.76 | — | — | 20 | — | — | — | — | — |
| Vulcanizing agent 2 | — | 4.29 | — | — | — | — | — | — | — |
| Vulcanizing agent 3 | — | — | 5.64 | — | — | — | — | — | — |
| Sulfur | — | — | — | — | 2.1 | 2.1 | 1 | — | — |
| Vulcanization accelerator CZ | 3.88 | 3.88 | 3.88 | 15 | — | 1 | 2 | — | — |
| Vulcanization accelerator NS | — | — | — | — | 1 | — | — | — | — |
| Vulcanization accelerator TT | — | — | — | — | — | — | — | 3.5 | — |
| Organic peroxide | — | — | — | — | — | — | — | — | 3.4 |
| Rheometer characteristics | | | | | | | | | |
| T95 | 13.33 | 16.11 | 11.65 | 5.05 | 10.83 | 9.22 | 8.53 | 20.34 | 52.73 |
| T-3 | None | None | None | None | 16.29 | 15.44 | 25.67 | None | None |
| T-5 | None | None | None | None | 17.29 | 16.3 | 28.73 | None | None |
| Physical properties before aging | | | | | | | | | |
| Strength at break (%) | 30.9 | 23.1 | 25.3 | 18.5 | 33.3 | 30.9 | 35.0 | 31.4 | 25.5 |
| Elongation at break (%) | 592 | 599 | 579 | 320 | 525 | 485 | 512 | 498 | 350 |
| Physical properties after aging | | | | | | | | | |
| Strength at break (%) | 24.0 | 21.0 | 23.4 | 16.8 | 21.4 | 20.6 | 25.5 | 25.6 | 20.0 |
| Elongation at break (%) | 537 | 563 | 576 | 303 | 363 | 328 | 397 | 421 | 353 |
| Retention rates after aging | | | | | | | | | |
| Strength at break (%) | 77.7 | 91.1 | 92.5 | 90.8 | 64.2 | 66.7 | 72.8 | 81.6 | 78.4 |
| Elongation at break (%) | 90.7 | 94.0 | 99.5 | 94.7 | 69.1 | 67.6 | 77.5 | 84.5 | 100.9 |

The following compounding agents were used.

IR: Nipol IR-2200, made by Nippon Zeon
Carbon black: HAF grade carbon black
zinc oxide: Zinc oxide No. 3
Stearic acid: Stearic acid for industrial use
Antioxidant: N-phenyl-N'-(1,3-dimethylbutyl)-p-phenylenediamine
Sulfur: 5% oil treated sulfur
Vulcanization accelerator CZ: N-cyclohexyl-2-benzothiazolyl sulfenamide
Vulcanization accelerator NS: N-t-butyl-2-benzothiazolyl sulfenamide
Vulcanization accelerator TT: Tetramethylthiuram disulfide
Organic peroxide: 1,3-bis-(t-butyl-oxyisopropyl)benzene From Table I, the rubbers of Comparative Examples 1 to 3 containing sulfur suffered from reversion and lower retention rates of physical properties before and after aging of the vulcanized rubber. Further, the rubbers of Comparative Examples 4 and 5 not using sulfur were slow in vulcanization rate (T 95) and also inferior in elongation at break after vulcanization. As opposed to this, the rubber compositions of Examples 1 to 4 containing the thiirane group-containing compounds, that is, the vulcanizing agents 1 to 3, and the thiirane ring-opening agents, that is, the rubber vulcanization accelerators, were free from reversion and were superior in the balance of the retention rates of the physical properties after aging of the vulcanized rubber and the vulcanization rate.

Examples 5 to 9

Next, rubber compositions of the formulations shown in the following Table II containing the vulcanization agent 2 and other various vulcanization accelerators were produced and evaluated in the same way as with the above Example 1 and gave excellent results similar to those of the above Examples.

TABLE II

| | Ex. 5 | Ex. 6 | Ex. 7 | Ex. 8 | Ex. 9 |
|---|---|---|---|---|---|
| IR | 100 | 100 | 100 | 100 | 100 |
| Carbon black | 50 | 50 | 50 | 50 | 50 |
| Zinc oxide | 3 | 3 | 3 | 3 | 3 |
| Stearic acid | 1 | 1 | 1 | 1 | 1 |
| Antioxidant | 1 | 1 | 1 | 1 | 1 |
| Vulcanizing agent 2 | 4.29 | 4.29 | 4.29 | 4.29 | 4.29 |
| Vulcanization accelerator TBBS | 3.5 | — | — | — | — |
| Vulcanization accelerator DCBS | — | 5.09 | — | — | — |
| Vulcanization accelerator TMTD | — | — | 3.53 | — | — |
| Vulcanization accelerator TMTM | — | — | — | 3.06 | — |
| Vulcanization accelerator TRA | — | — | — | — | 5.65 |

TABLE II-continued

|  | Ex. 5 | Ex. 6 | Ex. 7 | Ex. 8 | Ex. 9 |
|---|---|---|---|---|---|
| Rheometer characteristics |  |  |  |  |  |
| T95 | 22.97 | 44.83 | 6.95 | 35.64 | 4.26 |
| T-3 | None | None | None | None | None |
| T-5 | None | None | None | None | None |
| Physical properties before aging |  |  |  |  |  |
| Strength at break (%) | 30.2 | 27.3 | 28.2 | 24.9 | 23.9 |
| Elongation at break (%) | 540 | 610 | 446 | 643 | 339 |
| Physical properties after aging |  |  |  |  |  |
| Strength at break (%) | 26.5 | 24.8 | 21.8 | 25.4 | 22.7 |
| Elongation at break (%) | 490 | 513 | 364 | 543 | 274 |
| Retention rate after aging |  |  |  |  |  |
| Strength at break (%) | 87.7 | 90.8 | 77.3 | 102.0 | 95.0 |
| Elongation at break (%) | 90.7 | 84.1 | 81.6 | 84.4 | 80.8 |

The vulcanization accelerators used were as follows. The other compounding agents used were the same as those of Example 2.

Vulcanization accelerator TBBS: N-t-butyl-2-benzothiazolyl sulfenamide

Vulcanization accelerator DCBS: N,N'-dicyclohexyl-2-benzothiazolyl sulfenamde

Vulcanization accelerator TMTD: Tetramethylthiuram disulfide

Vulcanization accelerator TMTM: Tetramethylthiuram monosulfide

Vulcanization accelerator TRA: Dipentamethylenethiuram tetrasulfide

Examples 10 to 13 and Comparative Examples 6 and 7

Rubber compositions having the formulations shown in the Table I containing the vulcanizing agent 1 obtained above and vulcanization accelerator NS were produced and measured for rheometer characteristics as follows. The vulcanization was performed under conditions of 150° C.×30 minutes for Comparative Example 5 and 150° C.×30 minutes otherwise. The breaking strength and elongation at break were measured before and after aging at 100° C. for 48 hours and the retention rates (after aging/before aging) were determined. The results are shown in Table III.

Rheometer Characteristics

See above

100% and 300% Modulus

Measured according to JIS K6251

Strength and Elongation at Break

See above

Overcure Physical Property

Measured for the rubber vulcanized under the conditions of 150° C.×60 min.

Physical Property after Aging

Measured for the vulcanized rubber after aging under the conditions of 100° C.×48 hours.

TABLE III

|  | Comp. Ex. 6 | Comp. Ex. 7 | Ex. 10 | Ex. 11 | Ex. 12 | Ex. 13 |
|---|---|---|---|---|---|---|
| NR | 100 | 100 | 100 | 100 | 100 | 100 |
| Carbon black | 50 | 50 | 50 | 50 | 50 | 50 |
| Zinc oxide | 3 | 3 | 3 | 3 | 3 | 3 |
| Stearic acid | 1 | 1 | 1 | 1 | — | — |
| Antioxidant | 1 | 1 | 1 | 1 | 1 | 1 |
| Sulfur | 2.1 | 2.1 | 0.5 | 0.5 | 0.5 | — |
| Vulcanizing agent 1 | — | — | 2.43 | 3.65 | 3.65 | 3.65 |
| Vulcanization accelerator CZ | 1 | — | — | — | — | — |
| Vulcanization accelerator NS | — | 1 | 3.5 | 3.5 | 3.5 | 3.5 |
| Rheometer characteristics |  |  |  |  |  |  |
| T95 (min) | 10.33 | 11.48 | 23.53 | 21.00 | 15.33 | 33.07 |
| T-3 (min) | 16.11 | 14.25 | None | None | None | None |
| T-5 (min) | 17.20 | 15.43 | None | None | None | None |
| Tensile test |  |  |  |  |  |  |
| 100% Modulus (MPa) | 3.9 | 4.1 | 4.2 | 4.1 | 4.4 | 2.6 |
| 300% Mudulus (MPa) | 18.5 | 19.1 | 19.5 | 19.4 | 21.2 | 14.6 |
| Strength at break (MPa) | 29.1 | 29.1 | 28.5 | 28.3 | 27.4 | 28.0 |
| Elongation at break (%) | 450 | 437 | 427 | 437 | 380 | 490 |

TABLE III-continued

|  | Comp. Ex. 6 | Comp. Ex. 7 | Ex. 10 | Ex. 11 | Ex. 12 | Ex. 13 |
|---|---|---|---|---|---|---|
| Tensile test at overcuring |  |  |  |  |  |  |
| 100% Modulus (MPa) | 3.5 | 3.4 | 4.2 | 4.3 | 4.5 | 2.8 |
| 300% Mudulus (MPa) | 16.9 | 17.1 | 20.4 | 20.2 | 22.0 | 15.6 |
| Strength at break (MPa) | 26.4 | 26.9 | 27.7 | 28.4 | 26.9 | 27.6 |
| Elongation at break (%) | 457 | 447 | 408 | 420 | 360 | 463 |
| Tensile test after aging |  |  |  |  |  |  |
| 100% Modulus (MPa) | 4.3 | 5.1 | 4.4 | 4.4 | 4.4 | 2.8 |
| 300% Mudulus (MPa) | 20.2 | 22.0 | 20.8 | 20.7 | 22.3 | 14.9 |
| Strength at break (MPa) | 27.9 | 29.0 | 28.7 | 28.2 | 27.3 | 25.4 |
| Elongation at break (%) | 417 | 403 | 417 | 403 | 362 | 485 |
| Retention rate at overcuring |  |  |  |  |  |  |
| 100% Modulus (%) | 88.9 | 83.3 | 99.0 | 103.7 | 103.4 | 107.7 |
| 300% Mudulus (%) | 91.2 | 89.9 | 105.0 | 104.1 | 103.7 | 106.8 |
| Strength at break (%) | 90.7 | 92.3 | 97.1 | 100.2 | 98.3 | 98.6 |
| Elongation at break (%) | 101.5 | 102.3 | 95.5 | 96.2 | 94.7 | 94.5 |
| Retention rate after aging |  |  |  |  |  |  |
| 100% Modulus (%) | 111.1 | 124.8 | 105.5 | 107.3 | 100.7 | 107.7 |
| 300% Mudulus (%) | 109.0 | 115.5 | 106.6 | 106.7 | 105.3 | 102.1 |
| Strength at break (%) | 95.8 | 99.5 | 100.7 | 99.8 | 99.6 | 90.7 |
| Elongation at break (%) | 92.6 | 92.3 | 97.7 | 92.3 | 95.2 | 99.0 |

The following compounding agents were used.

IN: Natural Rubber RSS[#1]

Carbon black: HAF grade carbon black

Zinc oxide: Zinc oxide No. 3

Stearic acid: Stearic acid for industrial use

Antioxidant: N-phenyl-N'-(1,3-dimethylbutyl)-p-phenylenediamine

Sulfur: 5% oil treated sulfur

Vulcanization accelerator CZ: N-cyclohexyl-2-benzothiazolyl sulfenamide

Vulcanization accelerator NS: N-t-butyl-2-benzothiazolyl sulfenamide

From Table III, it is clear that, when the vulcanization is carried out with sulfur, the reversion is observed from the rheometer characteristics (T-3 and T-5) and the retention rates after aging are large. Contrary to this, when the vulcanizing agent 1 is used, the reversion does not occur and the retention rate after aging is close to 100%. Thus, the use of the vulcanizing agent 1 is superior to the use of sulfur with respect to the vulcanization characteristics and the aging characteristics.

According to the present invention, by blending into a rubber a vulcanizing agent comprised of a compound having at least two thiirane groups in a molecule, it is possible to prevent a reduction in or to improve the various physical properties of a vulcanized rubber after aging, possible to suppress scorching due to premature vulcanization or reversion, and obtain a rubber composition with a fast vulcanization rate. Further, according to the present invention, the modulus is improved by the addition of sulfur and the reaction between the thiirane group and the ring-opening agent can be accelerated with a metal oxide.

What is claimed is:

1. A rubber composition comprising a rubber, a compound having at least two thiirane groups in one molecule thereof and a compound having at least one protected group selected from the group consisting of a hydroxyl group, mercapto group, amino group, carboxyl group, aldehyde group, and hydrogen group bonded to the α-position of a carbonyl group.

2. A rubber composition comprising a rubber, a compound having at least two thiirane groups in one molecule thereof and a rubber vulcanization accelerator.

3. A rubber composition as claimed in claim 2, wherein the rubber vulcanization accelerator is a sulfenamide type vulcanization accelerator and/or thiuram type vulcanization accelerator.

4. A rubber composition as claimed in claim 2, comprising 100 parts by weight of the rubber, 0.1 to 30 parts by weight of the compound having thiirane groups and 0.1 to 30 parts by weight of the rubber vulcanization accelerator.

5. A rubber composition comprising 100 parts by weight of a rubber, 0.1 to 30 parts by weight of a compound having at least two thiirane groups in one molecule thereof, 0.1 to 30 parts by weight of a sulfenamide type vulcanization accelerator and/or a thiuram type vulcanization accelerator and 0.01 to 5 parts by weight of sulfur.

6. A rubber composition as claimed in claim 4 or 5, wherein 0.5 parts by weight or less of an organic fatty acid, based upon 100 parts by weight of the rubber, is further contained.

7. A rubber composition as claimed in claim 4, wherein 0.5 to 30 parts by weight of a metal oxide, based upon 100 parts by weight of the rubber, is further contained.

8. A rubber composition for a tire comprising a rubber composition according to claim 2.

9. A rubber composition as claimed in claim 6 wherein 0.5 to 30 parts by weight of a metal oxide, based upon 100 parts by weight of the rubber, is further contained.

10. A rubber composition as claimed in claim 1, wherein the protected groups are methylether, triphenylmethylether, benzylether, thrimethylsilylether, t-butyldimethylsilylether, t-butyldiphenylsilylether, tetrahydropyranylether, 2-methoxyethoxymethylether, methoxymethylether, acetonid (isopropylideneacetal), acetyl, benzoyl, p-nitrophenoxycarbonyl, silylenolether, acetoamide, trifluoroacetoamide, benzamide, phthalimide, benzylurethane, t-butoxyurethane, benzyl, p-toluene sulfonamide, salts of an amino group and an aliphatic carboxylic acid, a salt of an amino group and an aromatic carboxylic acid, methylester, t-butylester, benzylester, triphenylmethylester, salts of carboxyl group and aliphatic amines, salts of a carboxyl group and aromatic amines; formyl, dithioacetal, and thioether, benzylthioether, thioester, benzoylthioester, thiocarbamate, salts of thiol groups and aliphatic amines, salts of thiol groups and aromatic amines.

* * * * *